Jan. 30, 1923. 1,443,421.
C. B. LOGAN.
METHOD OF COMBINED ASSEMBLING AND LASTING SHOES.
FILED NOV. 17, 1921. 5 SHEETS—SHEET 3.

Inventor:
Charles B. Logan
By Chas. E. Riordan
Attorney.

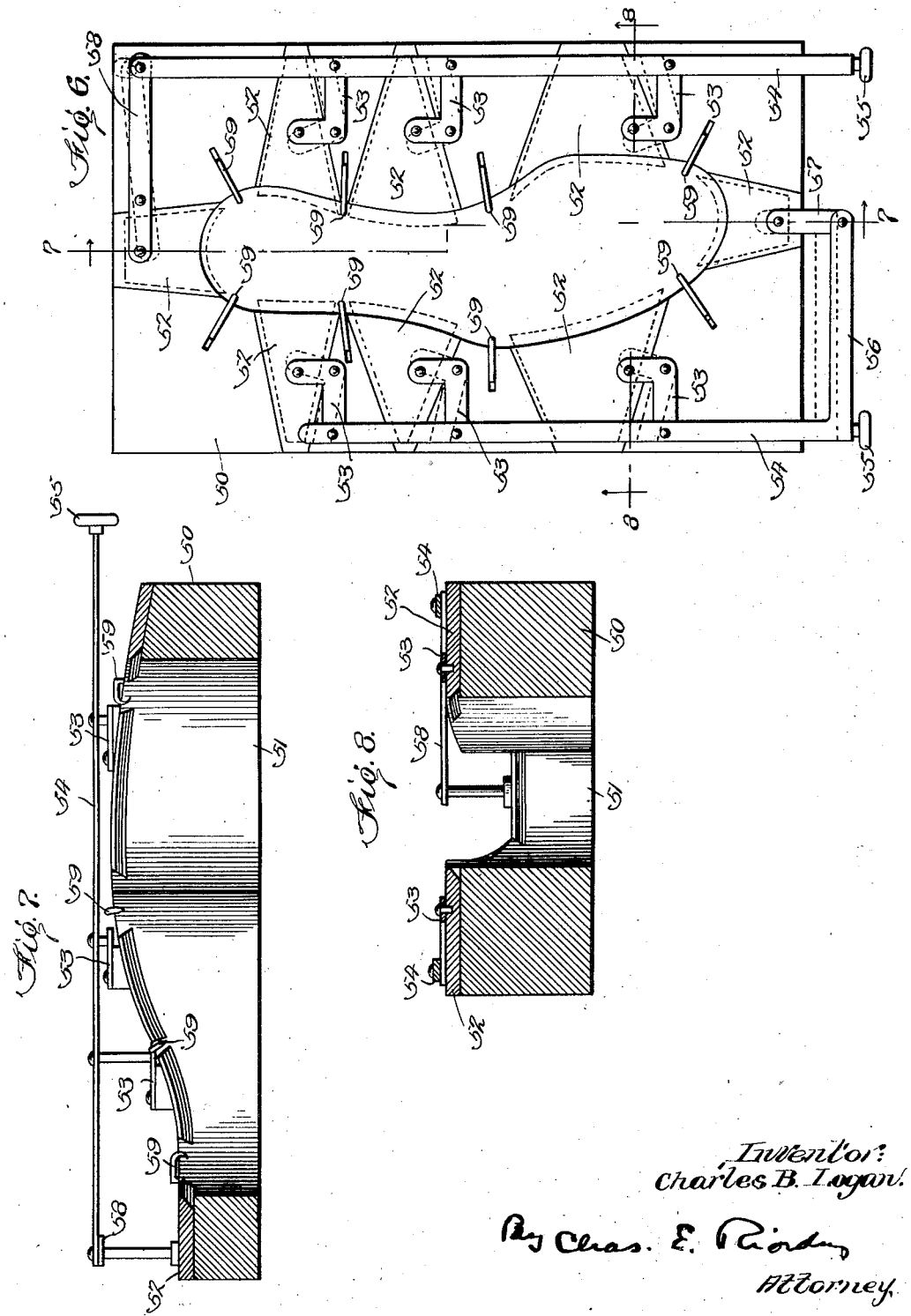

Jan. 30, 1923. 1,443,421.
C. B. LOGAN.
METHOD OF COMBINED ASSEMBLING AND LASTING SHOES.
FILED NOV. 17, 1921. 5 SHEETS—SHEET 5.

Inventor:
Charles B. Logan.

By Chas. E. Riordan,
Attorney.

Patented Jan. 30, 1923.

1,443,421

UNITED STATES PATENT OFFICE.

CHARLES B. LOGAN, OF PALMYRA, PENNSYLVANIA, ASSIGNOR TO THE FOOTWEAR DEVELOPMENT COMPANY, OF PALMYRA, PENNSYLVANIA, A CORPORATION OF PENNSYLVANIA.

METHOD OF COMBINED ASSEMBLING AND LASTING SHOES.

Application filed November 17, 1921. Serial No. 515,829.

*To all whom it may concern:*

Be it known that I, CHARLES B. LOGAN, a resident of Palmyra, in the county of Lebanon and State of Pennsylvania, a citizen of the United States, have invented certain new and useful Improvements in Methods of Combined Assembling and Lasting Shoes, of which the following is a specification.

This invention relates to the manufacture of shoes and has special reference to the method of assembling the sole and the upper, the present application being a division of an application filed by me January 18, 1921, Serial No. 438,132. The invention may be advantageously employed in the production of "stitch-down" shoes, in which the upper is formed with an outturned flange, and may also be used with equal efficiency in the manufacture of shoes having inturned flanges to be united with the inner and outer soles. By the practice of my invention, a number of machines heretofore necessary for performing different steps in the manufacture of shoes are dispensed with and the overhead charges of a factory thereby reduced.

My invention may be performed by employing apparatus such as is illustrated in the accompanying drawings and the invention consists in certain novel steps and sequence of steps which will be hereinafter fully set forth and particularly pointed out.

In the drawings:—

Figure 6 is a plan view of the mold employed when the upper is to have an inturned flange.

Figure 7 is a section on the line 7—7 of Figure 6.

Figure 8 is a section on the line 8—8 of Figure 6.

Figure 1:
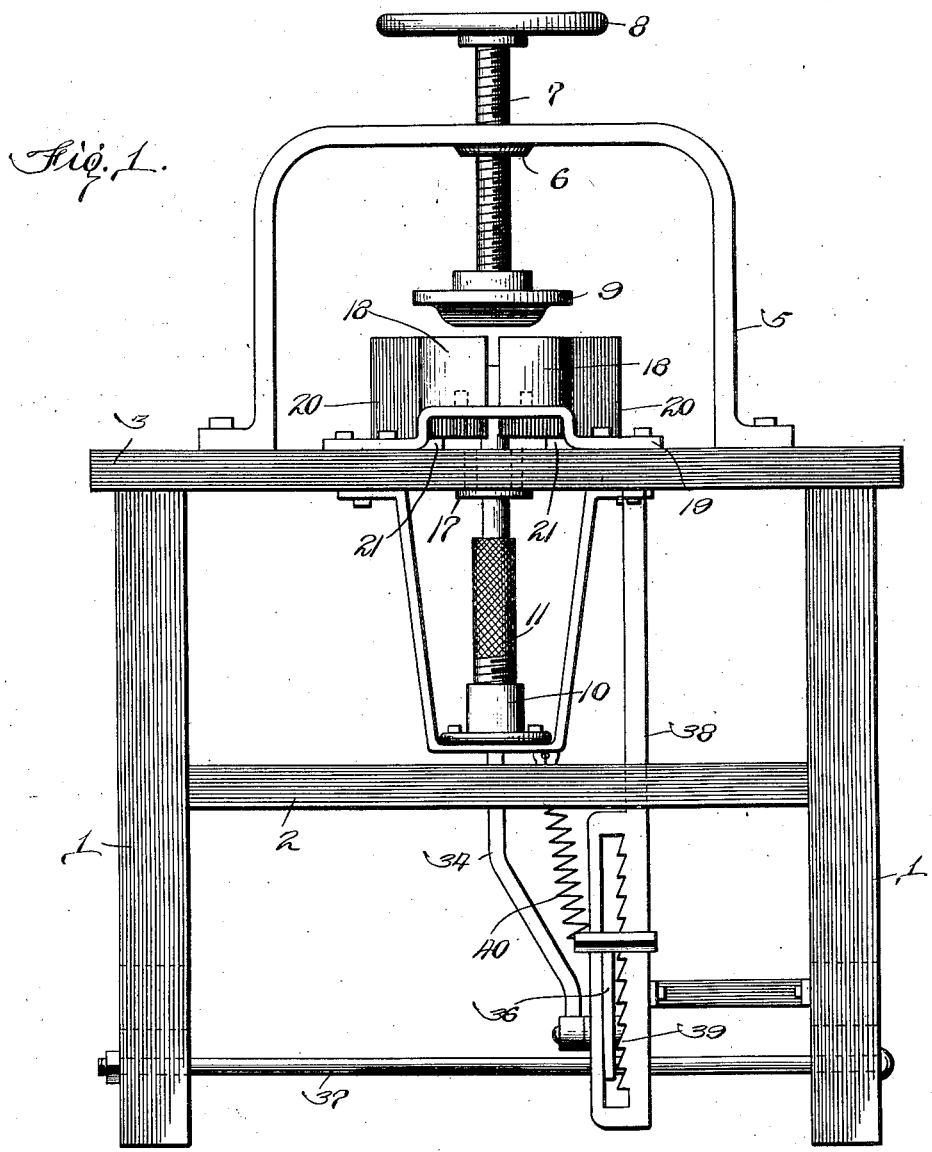
Fig. 1 is a front elevation of a machine embodying the invention.
Figure 2:
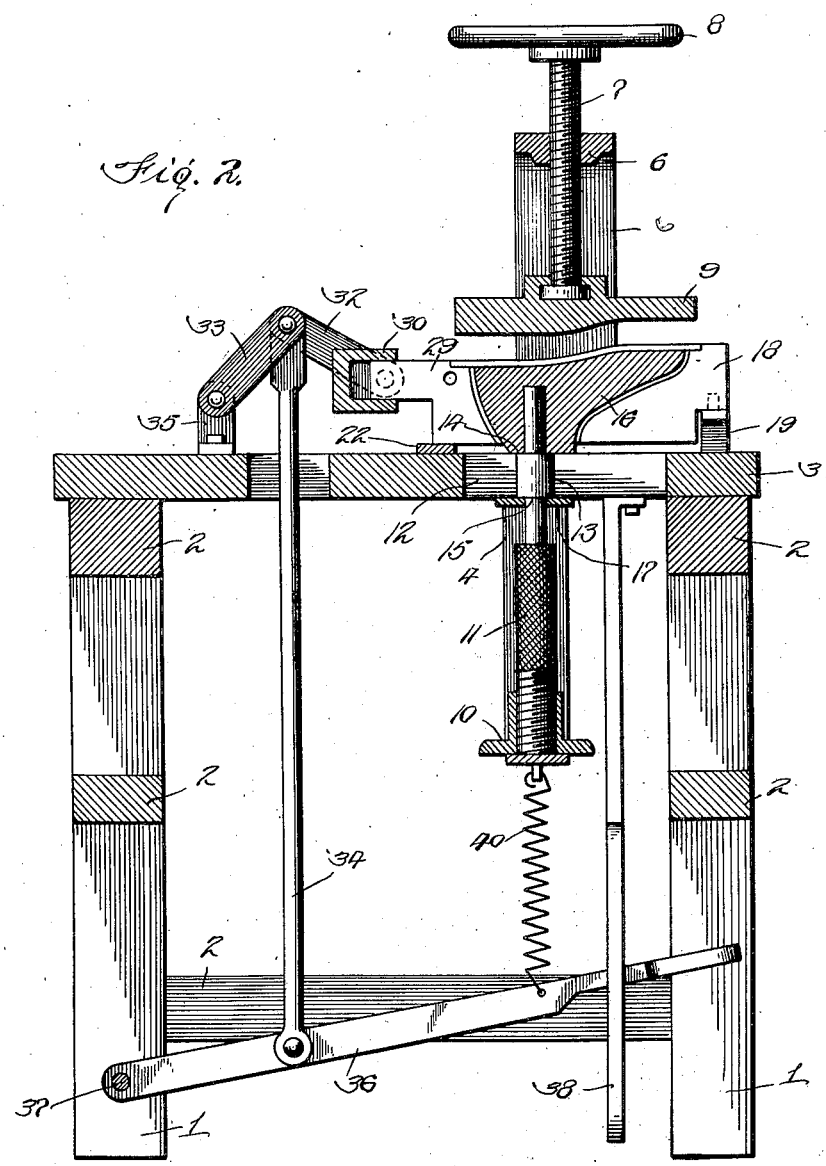
Figure 2 is a longitudinal section of the same.

In the illustrated embodiment of the invention, a supporting frame is shown consisting of legs 1, braces 2 connecting the legs, and a table top 3 carried by the legs. Secured to and depending from the table is a bracket or hanger 4 and on the table is a rigid upright frame or arch 5. In the top of the arch is a nut bearing 6 in which is mounted a screw 7 equipped with a hand wheel 8 at its upper end and carrying the pressure block 9 at its lower end, the under side of the presser block being shaped to conform to the sole of the shoe as will be readily understood on reference to Figure 10. The hanger 4 carries a nut or bearing 10 in which is engaged the threaded lower end of a post, pin or last shank 11, the surface of the post immediately above the threaded portion being knurled or otherwise fashioned so that a firm grip thereon may be obtained to effect rotation of the post with resultant vertical adjustment thereof. The upper portion of the post extends through an opening 12 in the table 3 and within the height of said opening is annularly enlarged, as at 13, whereby shoulders 14 and 15 are provided, the upper shoulder 14 being adapted to aid in supporting the last 16 and the lower shoulder 15 being adapted to rest upon a guide and support 17 fixed to the underside of the table.

Figure 5:
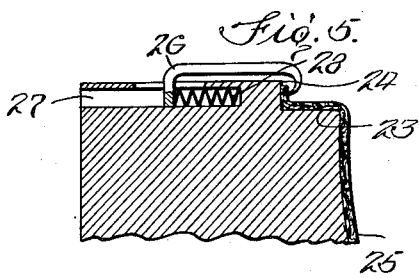
Figure 5 is an enlarged detail section on the line 5—5 of Fig. 4 showing a portion of an upper with an outturned flange in position upon the mold member.

The mold consists of two opposed jaws or clamping members 18 which are pivotally mounted at their front ends on the table in advance of the opening 12 and have their inner opposed faces shaped to conform to the last 16 or the shoe upon which they are to act, the pivoted ends of the jaws being supported on a bracket 19 which is secured rigidly upon the table. On their outer sides, the jaws or members 18 are provided with lateral projections 20 which, by adding weight to the jaws, reenforce the same and also, by riding upon the plates 21 at the sides of the opening 12, guide and support the jaws in their movements with a minimum frictional resistance and wear. The wear plates 21 are held by and between the front bracket 19 and the rear bracket 22, the last-named bracket also supporting the rear ends of the jaws. On their upper edges the jaws are recessed along their inner faces thereby providing a ledge 23 and a gage rib or shoulder 24, the upper 25 being supported in the mold by having its sole edge held upon the ledge and against the rib or shoulder as clearly shown in Fig. 5. To retain the upper in the illustrated position, fingers or grippers 26 are provided, said fingers being slidably mounted in slots or grooves 27 formed in the jaws at right angles to the respectively adjacent portions of the active face of the shoulder 24. By referring to Fig. 5, it will be noted that the slots or grooves do not extend through the shoulder so that the said shoulder is not interrupted but presents a smooth continuous surface against which the leather may be secured. It will also be noted that the gripper or finger is so shaped as to pass over the rib or shoulder and the outer end of the finger is turned down and plays in the slot or groove, a spring 28 being housed in each slot or groove between the shoulder and the downturned end of the finger and serving by its expansion to hold the front hook-like end of the finger in engagement with the edge of the upper, as shown in Fig. 5.

Figure 3:
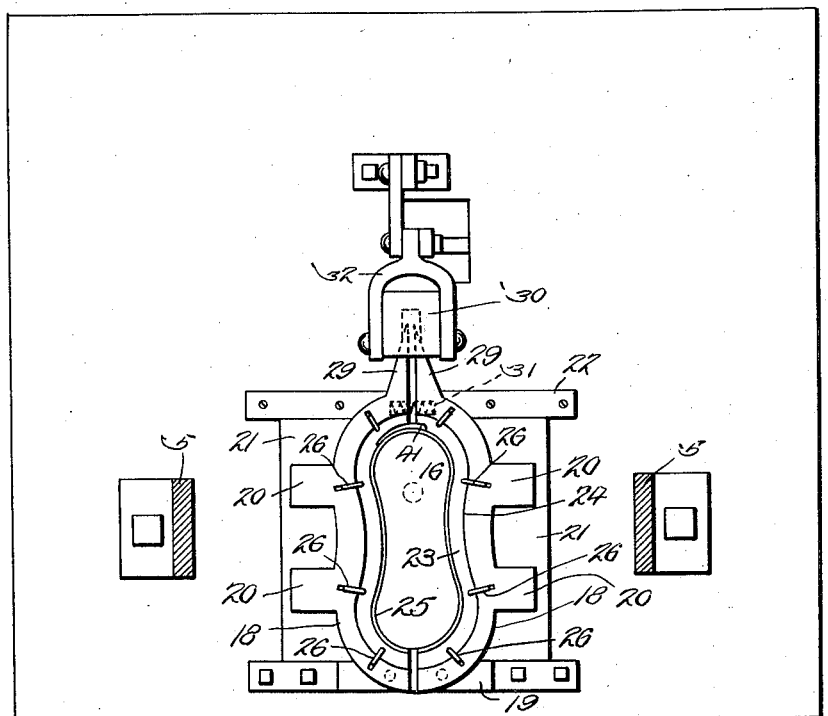
Figure 3 is a plan view with the plunger or presser removed, parts of the supporting frame for the presser being shown in section.
Figure 4:
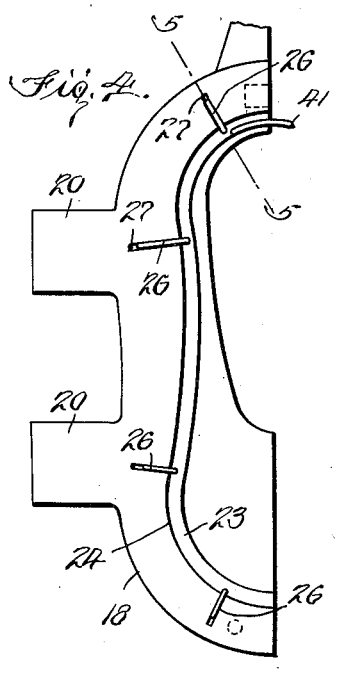
Figure 4 is an enlarged plan view of one of the clamping jaws or mold members with the gripping fingers thereon.

At their rear ends, the jaws or mold members are provided with tapered tongues 29 which are received within a slidable socket 30 and are normally pressed apart by a coiled spring 31 disposed between the inner faces of the jaws at the bases of the tongues and held in sockets formed therein as will be readily understood upon reference to Fig. 3. The socket is carried by a fork 32 which is pivoted at its front end to the socket and at its rear end is pivotally connected to the front end of a toggle link 33 and the upper end of a pitman 34, the link being pivoted at its rear end to a bracket 35 on the table and the pitman being pivoted at its lower end to a foot lever or treadle 36 below the table. The treadle is fulcrumed upon a rod 37 extending between the rear legs 1 and its front end plays in a slotted guide 38 depending from the table, one wall of the guiding slot being formed with stops or teeth 39 under any one of which the treadle may be engaged to be held in its lowered position against the action of the spring 40 which is secured to the treadle and to the hanger 4 and which raises the treadle instantly upon release of the same from the holding tooth 39.

Figure 9:
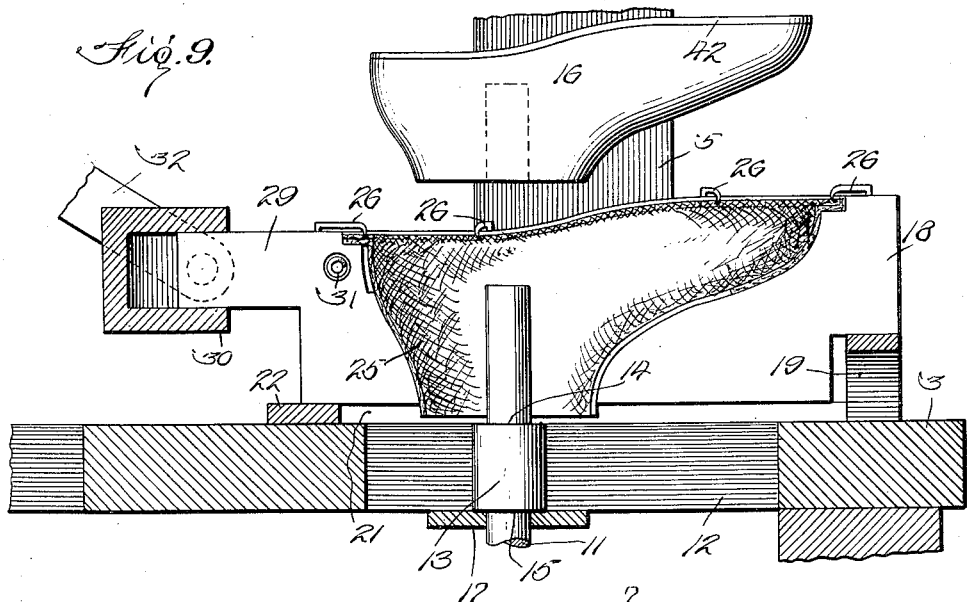
Figures 9 and 10 are enlarged longitudinal sections showing the manner of lasting the upper and assembling the sole therewith.
Figure 10:
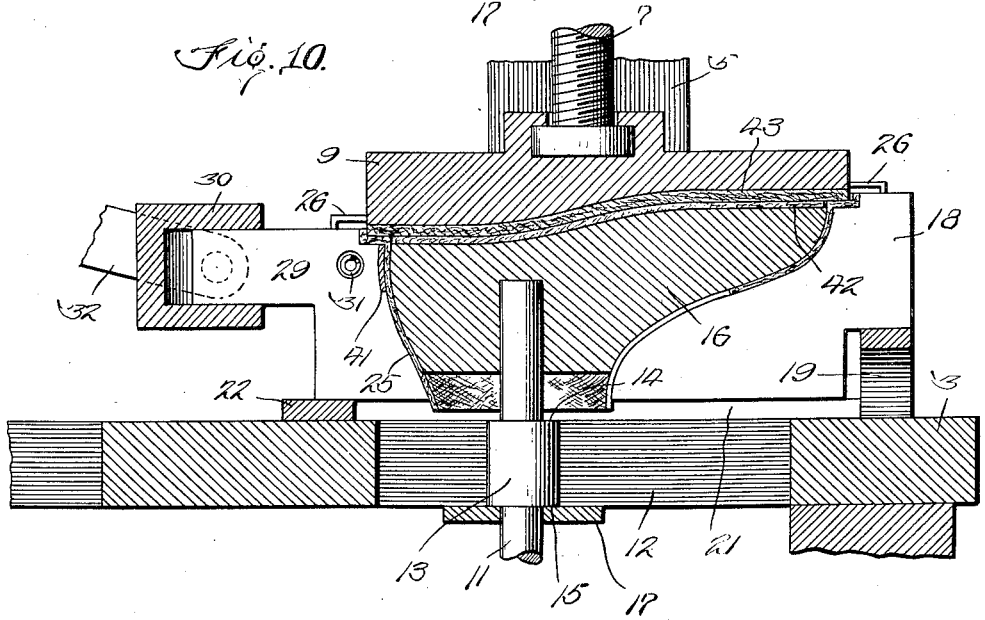

In using the machine, an inverted upper is suspended in the mold as shown in Fig. 9, the edge of the upper being stretched over the ledge 23 and against the shoulder 24. The last is then placed in position within the upper and engaged over the pin or shank 11. The presser or plunger 9 is then brought down so as to force the last home upon the pin thereby stretching the upper closely upon the last. The treadle is then depressed, pulling downwardly through the pitman 34 and straightening the toggle 33, 32 whereby the socket 30 will be forced over the tapered tongues 29 and the jaws swung to the last so as to clamp and mold the upper against the last throughout the surface thereof. The treadle is then engaged under a tooth 39 to be held depressed until the shoe is to be removed, and it is to be noted that one of the jaws carries a leaf spring 41 receivable in a proper recess in the other jaw so that the joint between the jaws will be bridged and pinching of the upper as the mold is closed will be avoided. The presser or plunger is then raised and an insole 42 placed upon the last to lie flush with the outturned flange of the upper, the insole and said flange being coated with cement. The outer sole 43 is then placed over the coated surfaces and the presser block brought down upon the outer sole, as shown in Fig. 10, so as to obliterate all blisters or wrinkles and obtain perfect contact and adhesion throughout the opposed surfaces. After the cement is dry the presser is raised, the fingers are withdrawn from the upper, and the treadle is released whereupon the socket 30 will be withdrawn from the tongues 29 and the mold opened. By then rotating the pin or shank 11 it will be caused to rise in its bearing nut 10 and raise the last and the shoe thereon above the mold to a point where they may be conveniently grasped and easily lifted from the pin. The pin is then lowered and the described operation repeated with another shoe. While the shoe is still upon the last the flange of the same is sewed or nailed to the outer sole and the edges of the sole and the flange trimmed smooth and even, after which the last is removed from the shoe.

The method and mechanism so far described are for producing a shoe with an outturned flange. To produce a shoe with an inturned flange, the mold previously described is removed and the mold shown in Figs. 6, 7 and 8 is substituted therefor, the substituted mold comprising a body 50 adapted to rest on the table between the brackets 19 and 22 and having a central opening 51, in which the upper is suspended. The opening 51 corresponds in shape to the shoe and the last is arranged in the opening in the same manner as previously described. Slidably mounted on the top of the mold are wipers 52 which operate substantially at a right angle to the opening 51 and are adapted to fold the edge of the upper over onto the insole, it being understood that an insole is placed on the last, and coated with cement before the last has been forced into position within the upper.

To operate the wipers, I pivotally mount an angle lever 53 on the mold adjacent each side wiper and one arm of the lever is pivoted to the adjacent wiper while the other arm of the lever extends toward the adjacent side of the mold. The outwardly projecting arms of all the levers are pivoted to a link or push-bar 54 extending to the front of the mold and equipped with a handle 55 of any preferred or convenient form. One of the push bars is provided adjacent its front end with a lateral arm 56 extending toward the central plane of the mold and the free end of this lateral arm is connected by a link 57 with the toe wiper 52. At the opposite side of the mold, the push bar is pivoted at its rear end to a straight lever 58 which is fulcrumed between its ends upon the mold and has its inner end pivotally connected with the heel wiper 52. Gripper fingers 59 are provided upon the mold to stretch the upper and suspend it in the mold.

After the insole has been placed in position, as above stated, the gripper fingers are released and the push bars 54 shoved rearwardly thereby actuating the wipers so that they will move inwardly over the edge of the insole and fold the edge of the upper onto the same. The outer sole, coated with cement on its under side, is then placed over the insole and the inturned flange of the upper, after which the presser block is forced down upon the outer sole to hold the parts in contact until the cement sets, after which the shoe is removed and trimmed.

From the foregoing description, taken in connection with the accompanying drawings, it will be seen that I have provided a strong, compact, simple, and easily operated machine by which shoes, particularly those of the "stitchdown" type, may be rapidly lasted and the usual pulling-over machine dispensed with.

It is to be understood that I do not limit myself to the specific details herein described and shown as various minor changes may be made therein within the scope of the appended claims.

Having thus fully described my invention what I claim as new and desire to secure by Letters Patent of the United States is:—

1. In the manufacture of shoes the method of assembling the parts thereof which comprises the suspending of an upper in a mold, forcing a last within the upper and shaping the upper between the last and the mold, forming a flange along the entire edge of the upper, applying an adhesive to said flange portion, applying an outer sole to the flange, applying pressure to the outer sole while the adhesive sets and then removing the shoe and last from the mold.

2. In the manufacture of shoes the method of assembling the parts thereof which comprises the forcing of a last into a suspended upper, shaping the upper under pressure about the last, supporting an insole upon the last, applying an adhesive to the insole, wiping the edge of the upper over the insole, applying an outer sole to the insole, and the edge of the upper, and applying pressure to the outer sole while the adhesive sets.

In testimony whereof I hereunto affix my signature.

CHARLES B. LOGAN